(12) United States Patent
Foss et al.

(10) Patent No.: US 7,963,173 B2
(45) Date of Patent: Jun. 21, 2011

(54) MAGNETIC FLOWMETER FOR MEASURING FLOW

(75) Inventors: Scot R. Foss, Eden Prairie, MN (US); Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 134 days.

(21) Appl. No.: 12/434,869

(22) Filed: May 4, 2009

(65) Prior Publication Data

US 2010/0275701 A1    Nov. 4, 2010

(51) Int. Cl.
*G01F 1/58* (2006.01)
(52) U.S. Cl. .................................................. 73/861.12
(58) Field of Classification Search .............. 73/861.12, 73/861.13, 204.22, 204.27; 438/14; 374/57
See application file for complete search history.

(56) References Cited

U.S. PATENT DOCUMENTS

| | | | | |
|---|---|---|---|---|
| 4,236,410 | A | 12/1980 | Appel et al. | 73/861.12 |
| 6,579,731 | B2 * | 6/2003 | Yun | 438/14 |
| 7,070,324 | B2 * | 7/2006 | Budmiger | 374/57 |
| 7,219,557 | B2 * | 5/2007 | van Willigen | 73/861.12 |
| 2002/0068371 | A1 | 6/2002 | Yun | |
| 2004/0037349 | A1 | 2/2004 | Budmiger | |
| 2005/0229714 | A1 | 10/2005 | Willigen | |

FOREIGN PATENT DOCUMENTS

JP             08014971             1/1996

OTHER PUBLICATIONS

The International Search Report and Written Opinion for corresponding PCT/US2010/032484, filed Apr. 27, 2010.

* cited by examiner

*Primary Examiner* — Jewel Thompson
(74) *Attorney, Agent, or Firm* — Westman, Champlin & Kelly, P.A.

(57) ABSTRACT

A magnetic flowmeter for measuring flow of a flow of process fluid, includes a flow tube arranged to receive the flow of process fluid therethrough. A magnetic drive coil proximate the flow tube is arranged to apply a magnetic field to the flow in response to a drive signal. At least one electrode is arranged to sense an electrical potential of the process fluid which related to the applied magnetic field and flow rate of the process fluid. Temperature measurement circuitry is coupled to the magnetic drive coil and is configured to provide a temperature output indicative of temperature of the drive coil based upon an electrical parameter of the drive coil. Flow measurement circuitry coupled to the at least one electrode is configured to provide a flow output based upon sensed electrical potential.

24 Claims, 7 Drawing Sheets

MAGNETIC FLOWMETER FOR MEASURING FLOW

BACKGROUND OF THE INVENTION

The present invention relates to magnetic flowmeters that sense the flow of process fluid in industrial process plants. More specifically, the present invention relates to measurement of flow using a magnetic flowmeter.

Magnetic flowmeters are known in the art and utilized electrically insulated flow tube that carries a flow of process fluid past a coil of an electric magnet and past electrodes. The electrode magnet applies electromagnetic field to the flowing process fluid. Due to Faraday's Law of electromagnetic induction, a voltage or Electro Mode of Force (EMF) is generated between a pair of electrodes in the fluid. This voltage is a function of the strength of the applied magnetic field and is proportional to the rate of flow of the fluid.

The sensed voltage is proportional to the volumetric flow rate of process fluid through the flow tube. However, mass flow rate is related to both the density of the fluid as well as its velocity. Mass flow rate can be calculated by multiplying the density of the fluid velocity and the cross sectional area of the flow tube. However, for many fluids, fluid density is related to the temperature of the fluid. In order to use a typical magnetic flowmeter to measure mass flow, a separate temperature sensor must be utilized to perform the mass flow calculation.

SUMMARY

A magnetic flowmeter for measuring flow of a flow of process fluid, includes a flow tube arranged to receive the flow of process fluid. A magnetic drive coil proximate the flow tube is arranged to apply a magnetic field to the flow in response to a drive signal. At least one electrode is arranged to sense an electrical potential of the process fluid which related to the applied magnetic field and flow rate of the process fluid. Temperature measurement circuitry is coupled to the magnetic drive coil and is configured to provide a temperature output indicative of temperature of the drive coil based upon an electrical parameter of the drive coil. Flow measurement circuitry coupled to the at least one electrode is configured to provide a flow output based upon sensed electrical potential.

DETAILED DESCRIPTION

The present invention provides a magnetic flowmeter for measuring mass flow in which an electrical parameter of a coil of the flowmeter is measured and used to provide temperature compensation to the mass flow measurement.

Figure 1:
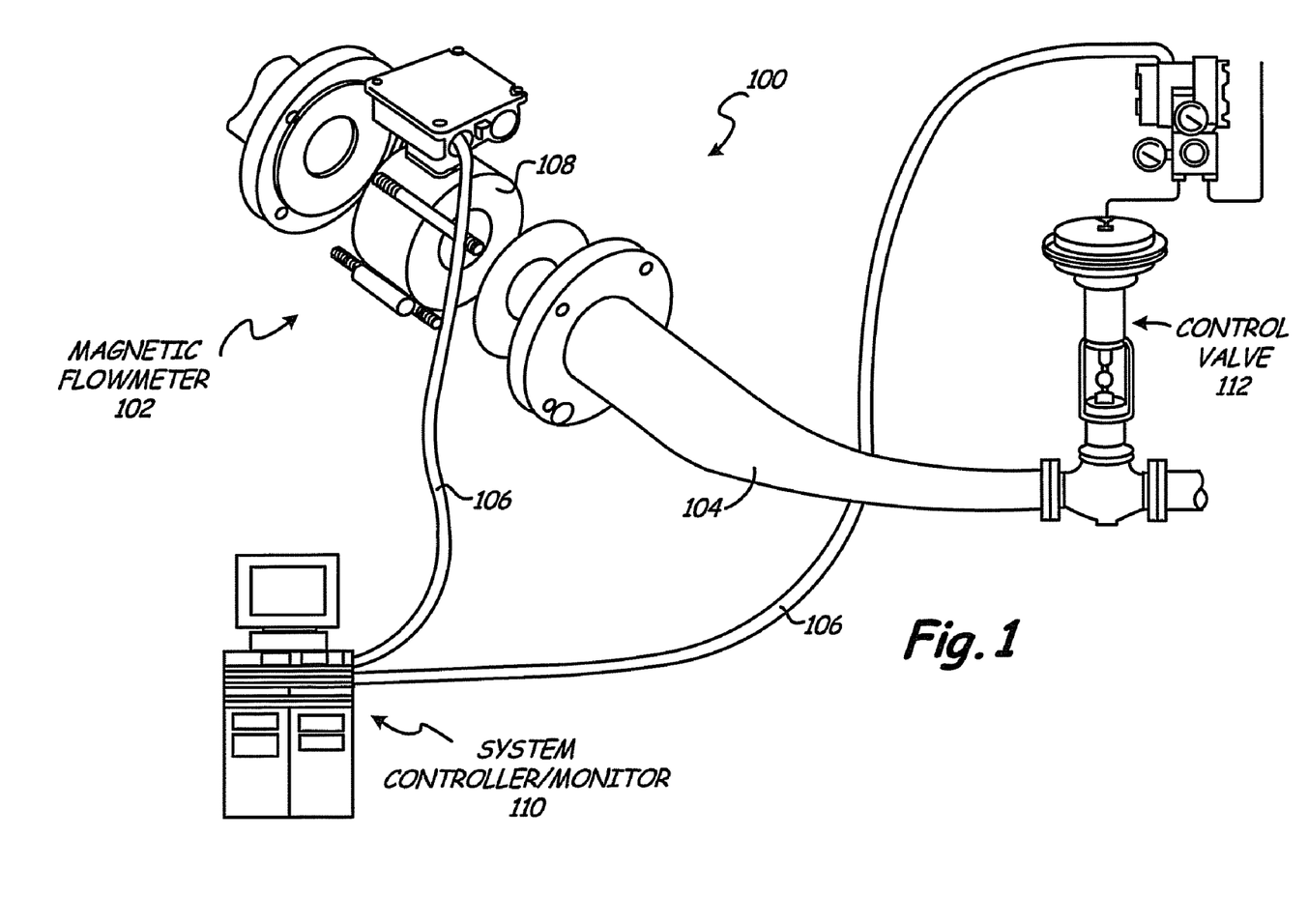
FIG. 1 is a diagram showing a process control system including a magnetic flowmeter.

In FIG. 1, a typical environmental for magnetic flowmeter 102 is illustrated at 100. In FIG. 1, magnetic flowmeter 102 is shown coupled to process piping 104 which also couples to control valve 112. Magnetic flowmeter 102 is an example of one type of process variable transmitter which can be configured to monitor one or more process variables associated with fluids in a process plant such as slurries, liquids, vapors and gases in chemicals, pulp, petroleum, gas, pharmaceutical, food and other fluid processing plants. In a magnetic flowmeter, the monitored process variable relates to velocity of process fluid through flow tube 108. Magnetic flowmeter 102 outputs are configured for transmission over long distances to a controller or indicator via communication bus 106. In typical processing plants, communication bus 106 can be a 4-20 mA current loop, a fieldbus connection, a pulse output/frequency output, a HART protocol communication, a wireless communication connection, ethernet or a fiberoptic connection to a controller such as system controller/monitor 110 or other device. System controller 110 is programmed as a process monitor, to display flow information for a human operator or as a process controller to control the process using control valve 112 over communication bus 106.

Figure 2:
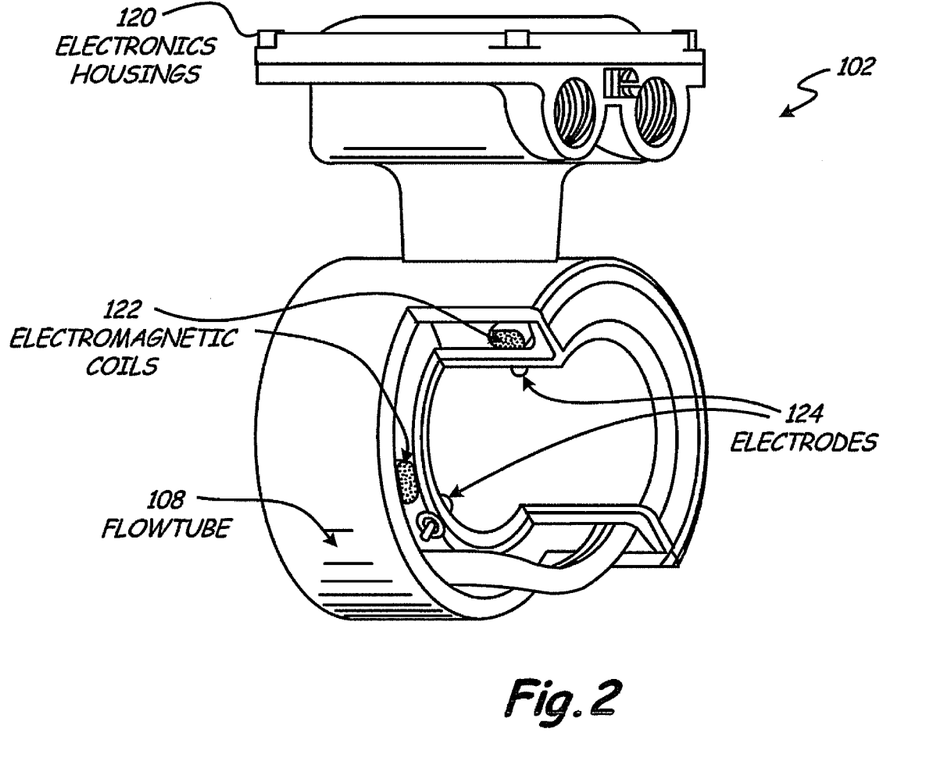
FIG. 2 is a partial cutaway view of the magnetic flowmeter FIG. 1.

In FIG. 2, a perspective cutaway view of magnetic flowmeter 102 is shown generally. Flowmeter 102 includes electronics housing 120 connected to flow tube 108. Flow tube 108 includes electromagnetic coils 122 which are used to induce a magnetic field in fluid flowing through flow tube 108. The electrodes 124 in flow tube 108 provide an EMF sensor which senses the EMF generated in the fluid due to the velocity of the flow and the applied magnetic field and which are also sensitive to noise. Coil driver circuitry 130 (shown in FIG. 3) in electronic housing 120 provides a drive signal to electromagnetic coils 122 and electrodes 124 provide EMF output 134 to EMF signal amplifier 132 (also shown in FIG. 3).

Figure 3:
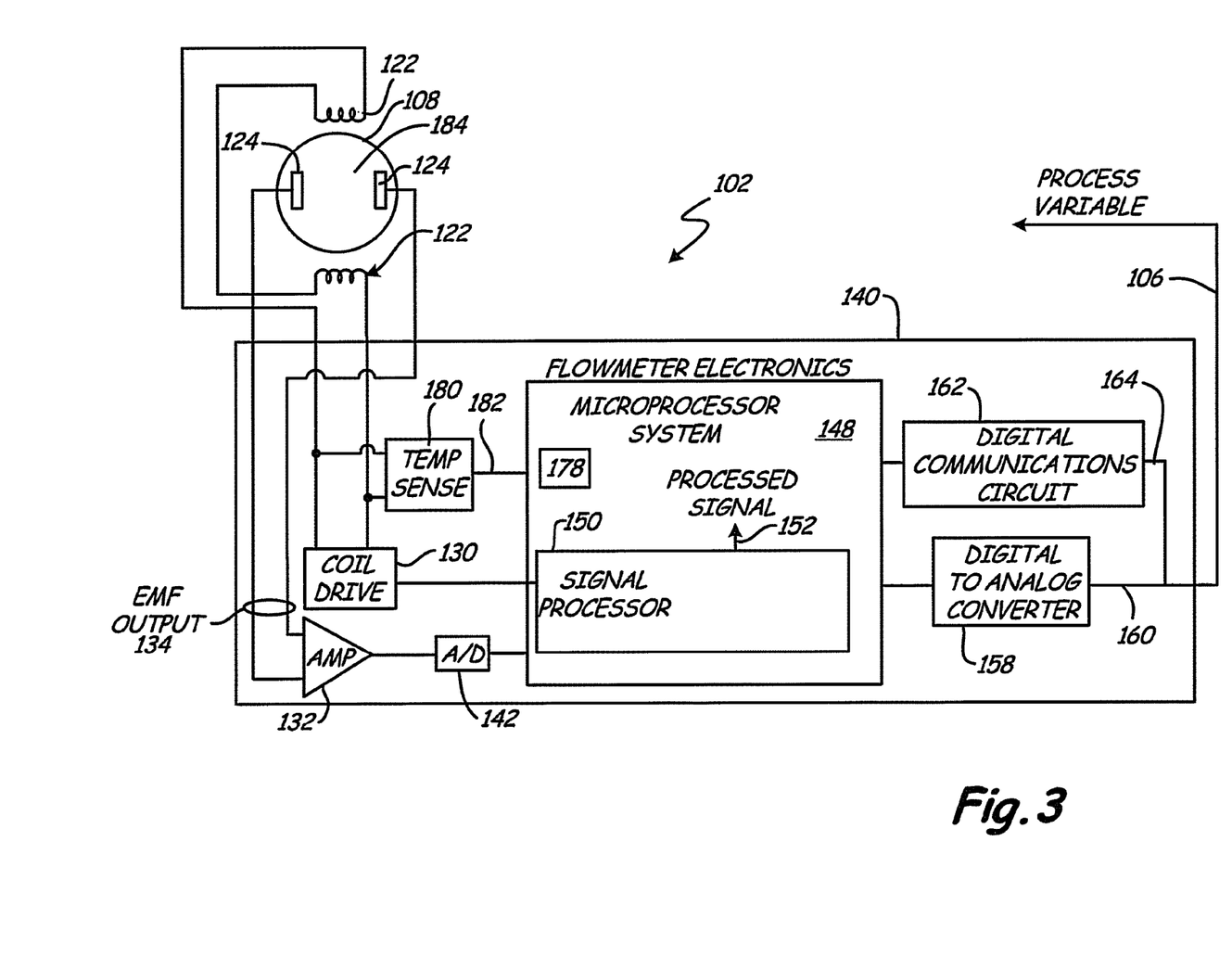
FIG. 3 is a simplified block diagram showing components of the magnetic flowmeter FIG. 2.

In FIG. 3, a block diagram shows one embodiment of magnetic flowmeter 102 for measuring a flow of a conductive process fluid through flow tube assembly 108. Coils 122 are configured to apply an external magnetic field in the fluid flow in response to an applied drive current from coil driver 130. EMF sensors (electrodes) 124 electrically couple to the fluid flow and provide an EMF signal output 134 to amplifier 132 related to an EMF generated in the fluid flow due to the applied magnetic field, and fluid velocity. Analog to digital converter 142 provides a digitized EMF signal to microprocessor system 148. A signal processor 150 is implemented in microprocessor system 148 of flowmeter electronics 140 which couples to the EMF output 134 to provide an output 152 related to fluid velocity. A memory 178 can be used to store program instructions or other information as discussed below.

Microprocessor system 148 calculates velocity through flow tube 108 in accordance with a relationship between the EMF output 134 and the flow velocity as set forth in Faraday's law, which states:

$$V = \frac{E}{kBD} \qquad \text{Eq. 1}$$

Where E can be the signal output 152 which is related to the EMF output 134, V is the velocity of the fluid, D is the diameter of flow tube 108 and B is the strength of the magnetic field in the fluid. k is a constant of proportionality.

Microprocessor system 148 uses velocity to calculate flow of the process fluid in accordance with known techniques. A digital to analog converter 158 coupled to microprocessor system 148 generates an analog transmitter output 160 for coupling to communication bus 106. A digital communication circuit 162 generates a digital transmitter output 164. The analog output 160 and the digital output 164 can be coupled to process controllers or monitors as desired.

In accordance with the present invention, flowmeter 102 also includes temperature sense circuitry 180. Temperature sense circuitry 180 is configured to couple to the coil 122 and provide an output 182 to microprocessor system 148 which is related to the temperature of the coil 122. Temperature sense circuitry 180 may operate in accordance with any technique and one example embodiment is discussed below in more detail. Using the sensed temperature as well as the sensed EMF 134, microprocessor system 148 calculates the mass flow as:

$$M = \alpha \cdot V \cdot A \qquad \text{Eq. 2}$$

Where M is the mass flow rate, $\alpha$ is density of the fluid, V is the velocity in accordance with Equation 1 and A is the cross-sectional area of the flow tube.

As discussed in the background section and in accordance with Equation 2, calculation of mass flow requires a determination of the density. In some examples, a fixed density value is entered by the operator and used to calculate mass flow regardless of the temperature. However, this can lead to substantial errors. For example, a temperature change from 0° C. to 177° C. will result in more than a 10% change in the density of water. The measurement of temperature of the fluid by the mass flow meter can be used to calculate fluid density and provide improved accuracy in mass flow measurements. Further, the temperature information can be used as a redundant measurement point. Any additional temperature information provided by the mass flow meter can be used to compare or validate a measurement from a separate temperature sensor. Temperature information can also be used to provide an indication that the process had exceeded its expected temperature limits, or the temperature limits of particular components in the process such as the flowtube. Such excessive temperatures may result in a shortened life span and premature failure of components.

With the present invention, the temperature of the flowtube and process fluid is inferred by providing a temperature related output based upon a signal flowing through the coils 122 of the flowmeter. For example, the resistance and inductance of the coils 122 adjacent to flowtube 108 can be measured and are related to coil temperature. This can be used to infer the temperature of process fluid carried in flowtube 108.

Figure 4A:
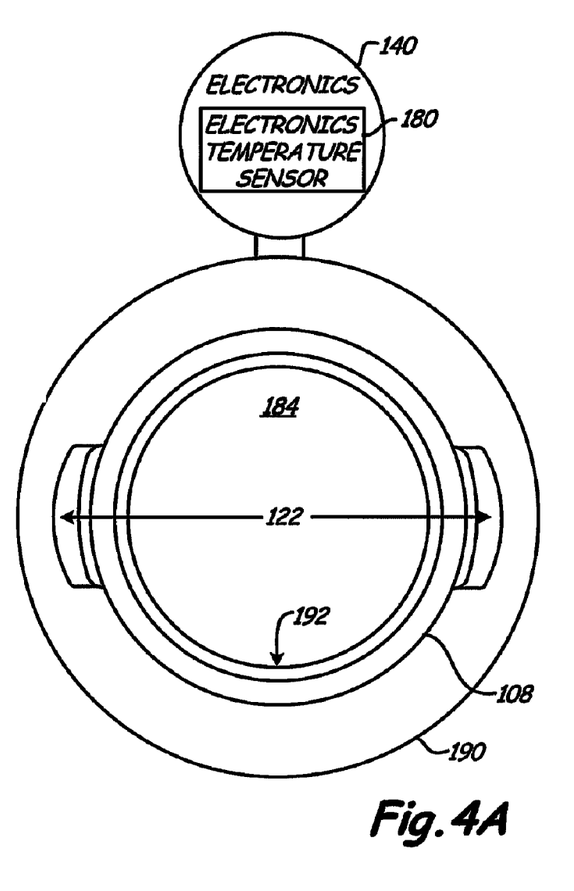
FIG. 4A is a simplified cross-sectional view of a mass flowmeter flowtube.

FIG. 4A is simplified cross-sectional view of flowmeter 102 and shows flowtube 108 carried in a flowtube housing 190. The coils 122 are positioned adjacent the flowtube 108. A nonconductive flowtube liner 192 lines the tube 108. Tube 108 may comprise, for example, stainless steel.

Figure 4B:
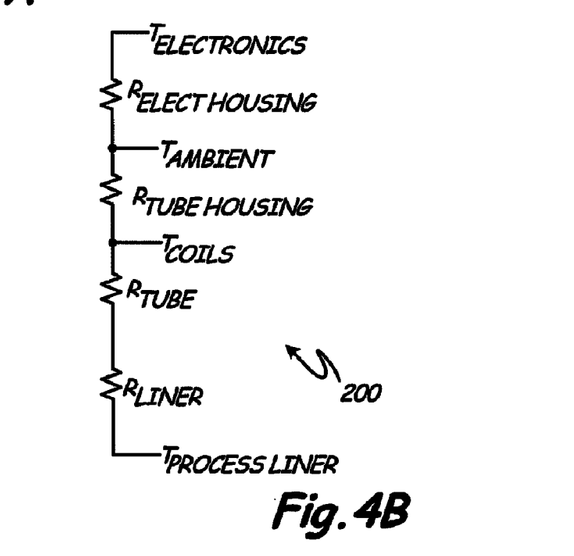
FIG. 4B is a simplified electrical equivalent schematic diagram of the thermal conductance process of the flowmeter 4A.

FIG. 4B is a simplified electrical equivalent of the thermal conduction process of the flowtube arrangement illustrated in FIG. 4A. With FIG. 4B, the equivalent circuit 200 uses the following key:

$T_{Electronics}$—Electronics temperature
$T_{Ambient}$—Ambient Air Temperature
$T_{Coils}$—Coil Temperature
$T_{ProcessFluid}$—Temperature of the Process Fluid
$R_{Elect}$—Housing
$R_{Tube\ Housing}$—Thermal Resistance from the ambient air to the coils
$R_{Tube}$—Thermal Resistance of the stainless steel tube
$R_{Liner}$—Thermal Resistance of the liner In determining temperature of the process fluid, the ambient air temperature should be taken into account to accurately infer the process temperature. The electronics temperature can be used to infer the ambient air temperature as illustrated in FIG. 4B. For example, the electronics temperature is typically is about 10° C. greater than the ambient temperature. This can be calibrated during the manufacturing process or determined empirically.

Once the ambient temperature is identified, the process temperature can be determined using the following formula:

$$T_{Process\ Fluid} = \frac{T_{Coils} * \left( \begin{array}{c} R_{TubeHousing} + \\ R_{SST\_Tube} + R_{Liner} \end{array} \right)}{R_{TubeHousing}} + T_{Ambient} \qquad \text{Eq. 3}$$

The thermal resistance can be calculated or empirically measured for each line size of the flowmeter tube 108. This can also be calibrated during the manufacturing process to improve accuracy. Flowmeter 102 can store coefficients for each line size, or for individual flowtubes in transmitter combinations in memory 178 of microprocessor system 148.

Figure 5:
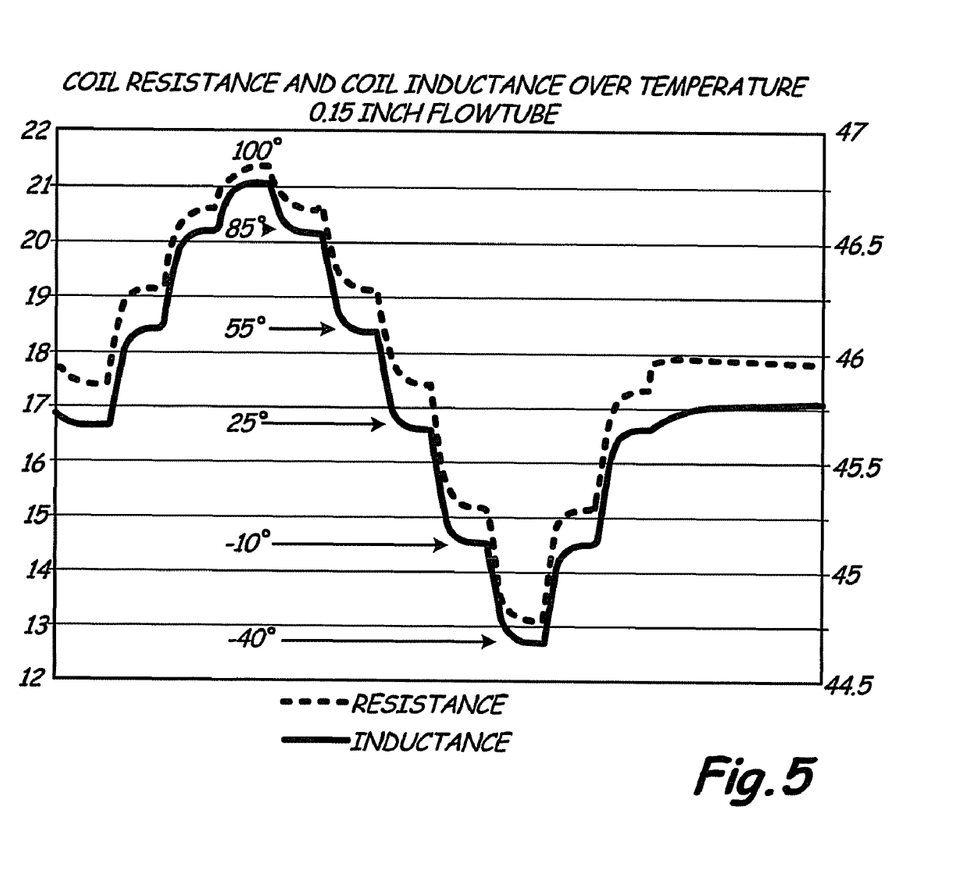
FIG. 5 is a graph showing coil resistance and coil inductance versus temperature.

FIG. 5 is a diagram which illustrates example data showing a relationship between coil resistance and coil inductance over temperature for a 0.15 inch flowtube. FIG. 5 is a graph of coil resistance (ohms) versus coil inductance (mH) which illustrates how they change linearly with temperature.

Figure 6:
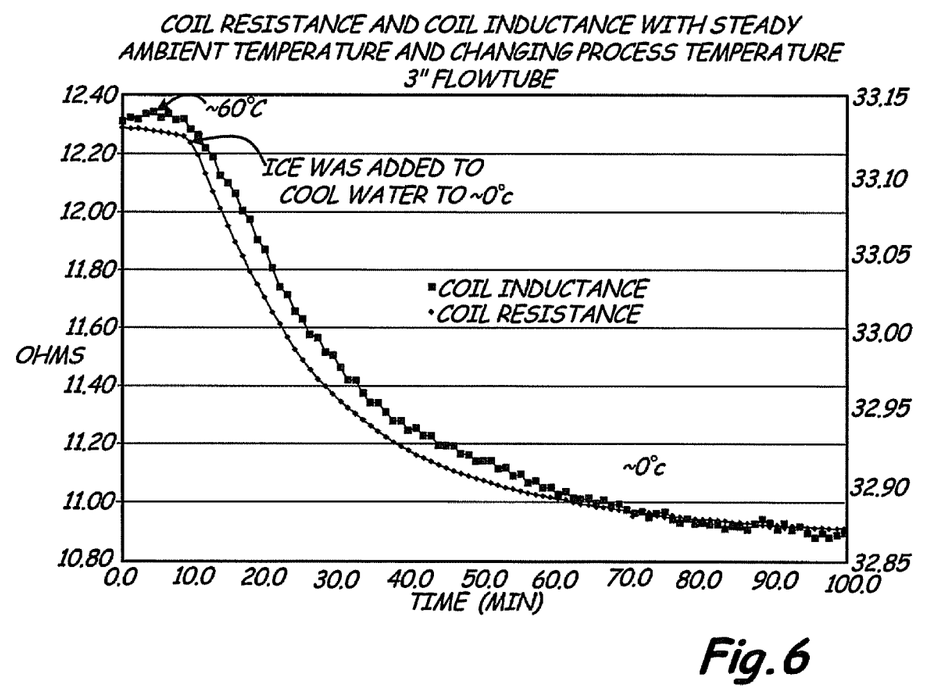
FIG. 6 is a graph of coil resistance and coil inductance versus time as temperature of a coil is changed.

FIG. 6 is a graph of coil resistance and coil inductance versus time. In the graph of FIG. 6, coil inductance and coil resistance are shown for a 3 inch diameter flowtube. To generate the graph of FIG. 6, hot water was placed into the flowtube. The temperature was allowed to settle and ice was added to the water to decrease the temperature in the tube to approximately 0° C. Note that the temperature will change more rapidly under normal flow conditions.

The effect of the process temperature on the coil measurement is heavily damped due to the large amount of mass that needs to change temperature. As the coil resistance measurement is very clean, it is easy to estimate where the measurement reading should be. For example, a linear curve that can be used to predict resistance. A first order low pass filter can be used to smooth the measurement data. This allows the system to react rapidly to step changes in temperature.

Figure 7:
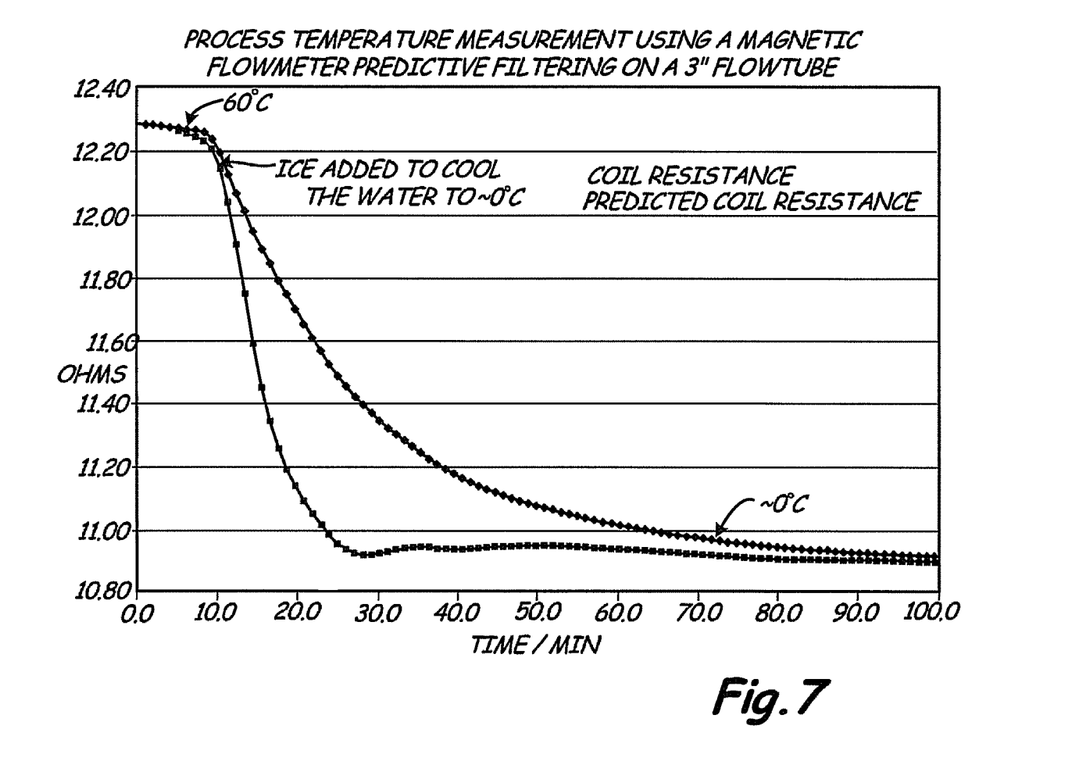
FIG. 7 is a graph of resistance versus time as coil temperature is changed.

FIG. 7 is a graph of resistance (ohms) versus time and shows the raw coil resistance and the predicted coil resistance across a change in temperature. The coil resistance in FIG. 7 was predicted by calculating a linear fit of the last five measurements. This fit was then projected fifteen measurement points into the future to provide predicted temperature. This is a relatively simple prediction model but it is capable of providing temperature information. A more complex prediction model can be employed in which a curve fit of a step change in temperature is determined for each particular line size. This information can be stored in memory 178.

In this example, circuitry 180 includes a differential amplifier connected to coil 122. The output from amplifier is digitized using an analog to digital converter and provided to microprocessor system 148. Software run by microprocessor system 148 can be configured to determine temperature of coil 122, and thereby infer the temperature of process fluid 184, using resistance of coil 122 in the following formula:

$$T\text{Coils} = \text{CoilResistance} * (\text{Coil Resistance Temperature Gain}) + (\text{Coil Resistance Temperature Offset}) \qquad \text{Eq. 4}$$

Similarly, inductance can be used to determine temperature using the formula:

$$T\text{Coils} = \text{Coil Inductance} * (\text{Coil Inductance Temperature Gain}) + (\text{Coil Inductance Temperature Offset}) \quad \text{Eq. 5}$$

The temperature gain and offset for the coil resistance inductance can be trimmed in the factory by measuring the coil resistance inductance at 2 different temperature points and then calculating the gain and offset. Since the Coil Resistance Inductance is linear with Coil Temperature, we can then calculate the Coil Temperature based on the Coil Resistance Inductance.

Determining temperature based upon inductance of coil 122 is preferable to determining temperature based upon resistance. This is because coil inductance is indifferent to changes in the resistance of the external wiring due to temperature changes or corrosion at the terminals. A remote mount configuration can have up to 1000 feet of cable. The coil inductance also allows the transmitter temperature reading to be calibrated at the factory with short coil wires, but when use longer wires in the field with very little installation effect. A 1000 feet of 18 AWG wire will have ~6.5 ohms of resistance over 1000 feet. This would require the ability to zero out any installation affect. This may not be required when using the coil inductance measurement.

Once the temperature of the process fluid is determined by microprocessor system 148, this temperature information can be used to compensate for density variations in determining mass flow in accordance with Equation 2.

The temperature information can also be used by microprocessor system 148 to provide an output if the temperature exceeds certain limits, for example, manufacturer limits, maximum or minimum process temperature limits, etc. Such an alert can be transmitted over communication bus 106. In another example configuration, the pressure of the process fluid is used in the mass flow computation. In such a configuration, pressure information can be received from another process device over communication bus 106. An additional temperature sensor can also be provided proximate flowtube 108, for example, near electrodes 124, to measure process temperature. This additional temperature sensor can be used for diagnostics, to provide a faster response time, or more accurate measurements.

Although the present invention has been described with reference to preferred embodiments, workers skilled in the art will recognize that changes may be made in form and detail without departing from the spirit and scope of the invention.

What is claimed is:

1. A magnetic flowmeter for measuring flow of a flow of process fluid, comprising:
    a flow tube arranged to receive the flow of process fluid therethrough;
    a magnetic drive coil approximate the flow tube arranged to apply a magnetic field in the flow tube in response to a drive signal;
    at least one electrode arranged to sense an electrical potential of the process fluid related to the applied magnetic field and flow rate of the process fluid;
    temperature measurement circuitry coupled to the magnetic drive coil configured to provide a temperature output indicative of temperature of the drive coil based upon an electrical parameter comprising electrical inductance of the drive coil; and
    flow measurement circuitry coupled to the at least one electrode configured to provide a mass flow output based upon sensed electrical potential and the electrical inductance.

2. The apparatus of claim 1 wherein the electrical parameter further comprises electrical resistance of the drive coil.

3. The apparatus of claim 1 wherein the flow measurement circuitry is configured to infer the temperature of the process fluid based upon the temperature output.

4. The apparatus of claim 3 wherein the flow circuitry is further configured to infer the temperature of the process fluid based upon ambient temperature.

5. The apparatus of claim 1 wherein the flow circuitry is configured to infer temperature of the process fluid based upon calibration coefficients stored in a memory.

6. The apparatus of claim 1 wherein the temperature output is configured for use in performing diagnostics.

7. The apparatus of claim 6 wherein the temperature output is used to identify if the process fluid temperature is outside of limits.

8. The apparatus of claim 6 wherein the temperature output is used to identify excessive temperature of the flowtube.

9. The apparatus of claim 1 wherein the flow measurement circuitry determines a temperature of the process fluid based upon a thermal resistance value.

10. The apparatus of claim 9 wherein the thermal resistance value is calculated.

11. The apparatus of claim 9 wherein the thermal resistance value is empirically measured.

12. The apparatus of claim 9 wherein the thermal resistance value is stored in a memory.

13. A method of measuring flow of a flow of process fluid, comprising:
    receiving the flow of processed fluid through a flow tube;
        applying a magnetic field to the flow of process fluid in the flow tube using a magnetic drive coil;
        sensing an electrical potential of the process fluid which is related to the applied magnetic field and the flow rate of the process fluid;
    sensing an electrical parameter comprising electrical inductance of the drive coil which is related to temperature of the drive coil; and
        determining mass flow of the process fluid through the flow tube based upon the sensed electrical potential of the process fluid and the electrical parameter.

14. The method of claim 13 wherein the electrical parameter comprises electrical resistance of the drive coil.

15. The method of claim 13 including inferring the temperature of the process fluid based upon the temperature output.

16. The method of claim 15 including inferring the temperature of the process fluid based upon ambient temperature.

17. The method of claim 13 inferring temperature of the process fluid based upon calibration coefficients stored in a memory.

18. The method of claim 13 including performing diagnostics based upon the electrical parameter.

19. The method of claim 18 wherein the temperature output is used to identify if the process fluid temperature which is outside of the limits.

20. The method of claim 18 including identifying excessive temperature of the flowtube based upon the electrical parameter.

21. The method of claim 13 wherein determining flow is based upon a thermal resistance value.

22. The method of claim 21 wherein the thermal resistance value is calculated.

23. The method of claim 21 wherein the thermal resistance value is empirically measured.

24. The method of claim 21 wherein the thermal resistance value is stored in a memory.

* * * * *